United States Patent
Bodley et al.

(10) Patent No.: US 10,747,366 B2
(45) Date of Patent: Aug. 18, 2020

(54) CALIBRATION DATA IDENTIFICATION

(71) Applicant: HEWLETT-PACKARD DEVELOPMENT COMPANY, L.P., Houston, TX (US)

(72) Inventors: Andrew Bodley, Fort Collins, CO (US); Lauren Domingo, Fort Collins, CO (US); Peter Christian Peterson, Fort Collins, CO (US); Ken Ogden, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 15/749,381

(22) PCT Filed: Nov. 23, 2015

(86) PCT No.: PCT/US2015/062160
§ 371 (c)(1),
(2) Date: Jan. 31, 2018

(87) PCT Pub. No.: WO2017/091198
PCT Pub. Date: Jun. 1, 2017

(65) Prior Publication Data
US 2018/0232103 A1 Aug. 16, 2018

(51) Int. Cl.
*G06F 3/041* (2006.01)
*G06F 13/38* (2006.01)
(Continued)

(52) U.S. Cl.
CPC .......... *G06F 3/0418* (2013.01); *G06F 13/14* (2013.01); *G06F 13/385* (2013.01); *G06F 13/40* (2013.01)

(58) Field of Classification Search
CPC ........ G06F 13/14; G06F 13/385; G06F 13/40; G06F 3/0418; G06F 3/0227
See application file for complete search history.

(56) References Cited

U.S. PATENT DOCUMENTS

| | | |
|---|---|---|
| 7,093,031 B2 | 8/2006 | Ray et al. |
| 7,757,010 B2 | 7/2010 | Chen et al. |

(Continued)

FOREIGN PATENT DOCUMENTS

| | | |
|---|---|---|
| CN | 103246620-1 | 8/2013 |
| WO | WO-2015088544 A1 | 6/2015 |

OTHER PUBLICATIONS

Yasin Nils Taib, "Universal Controller for Resistive Touch Screens," Goteborg, Sweden, Aug. 2010, 37 p.
(Continued)

*Primary Examiner* — Elias Desta
(74) *Attorney, Agent, or Firm* — Conley Rose PC

(57) ABSTRACT

Example implementations relate to calibration data identification. For example, a non-transitory computer readable storage medium comprising instructions that when executed cause a processor of a computing device to, in response to establishing a connection between the computing device and a first electronic device, request descriptor information of a second electronic device connected to the computing device via a universal serial bus (USB) interface of the computing device. The instructions when executed further cause the processor to identify calibration data of a third electronic device connected to the computing device based on the descriptor information and to control the first electronic device using the calibration data. The calibration data is stored at the second electronic device.

15 Claims, 6 Drawing Sheets

(51) Int. Cl.
G06F 13/14 (2006.01)
G06F 13/40 (2006.01)

(56) References Cited

U.S. PATENT DOCUMENTS

| | | |
|---|---|---|
| 8,230,121 B2 | 7/2012 | Filer et al. |
| 9,826,226 B2 * | 11/2017 | Kunkel ................. H04N 17/004 |
| 10,432,754 B2 * | 10/2019 | Fisher .................... H04L 69/326 |
| 2004/0041842 A1 | 3/2004 | Lippincott |
| 2006/0022963 A1 | 2/2006 | Bosch et al. |
| 2011/0025650 A1 | 2/2011 | Joscelyne |
| 2013/0145061 A1 | 6/2013 | Parivar et al. |
| 2014/0019651 A1 | 1/2014 | Ben-Harosh |

OTHER PUBLICATIONS

"Sensitivity and Sensitivity Units of the 333D01 ICPD Accelerometer," Aug. 11, 2014, 4 p. https://cdn.shopify.com/s/files/1/0607/8661/files/333D01_-_Sensitivity_White_Paper.pdf.

* cited by examiner

CALIBRATION DATA IDENTIFICATION

BACKGROUND

During manufacturing of electronic devices, external factors, such as equipment wear and tear, may cause each electronic device to have deviations in performance or characteristic. Thus, electronic devices may undergo a calibration operation to reduce the deviations.

BRIEF DESCRIPTION OF THE DRAWINGS

Some examples of the present application are described with respect to the following figures.

DETAILED DESCRIPTION

When an electronic device undergoes a calibration operation, calibration data may be generated and stored for subsequent usage. In some examples, the calibration data may be used by another electronic device during operation so that the two electronic devices can operate correctly together. For example, a digital pen may use calibration data of a display during operation so that the movement of the digital pen can be correctly captured by the digital pen driver. However, when calibration data is stored in a host device that is controlled via an operating system, the way the calibration data is stored may be dependent on the operating system.

Examples described herein provide a method to store calibration data as descriptor information. For example, the method may include, in response to establishing a connection between the computing device and an input device via a communication interface, requesting, via a device driver of the computing device, descriptor information of an electronic device connected to the computing device via a universal serial bus (USB) interface. The method may also include receiving the descriptor information from an operating system of the computing device. The method may further include identifying calibration data of a display device connected to the computing device based on the descriptor information, wherein the calibration data is stored at the electronic device. The method may further include controlling the input device using the calibration data. In this manner, examples described herein may provide a method to store and retrieve calibration data that is independent of an operating system. Thus, design complexity of an application (e.g., a device driver) that consumes the calibration data may be reduced.

Figure 1:
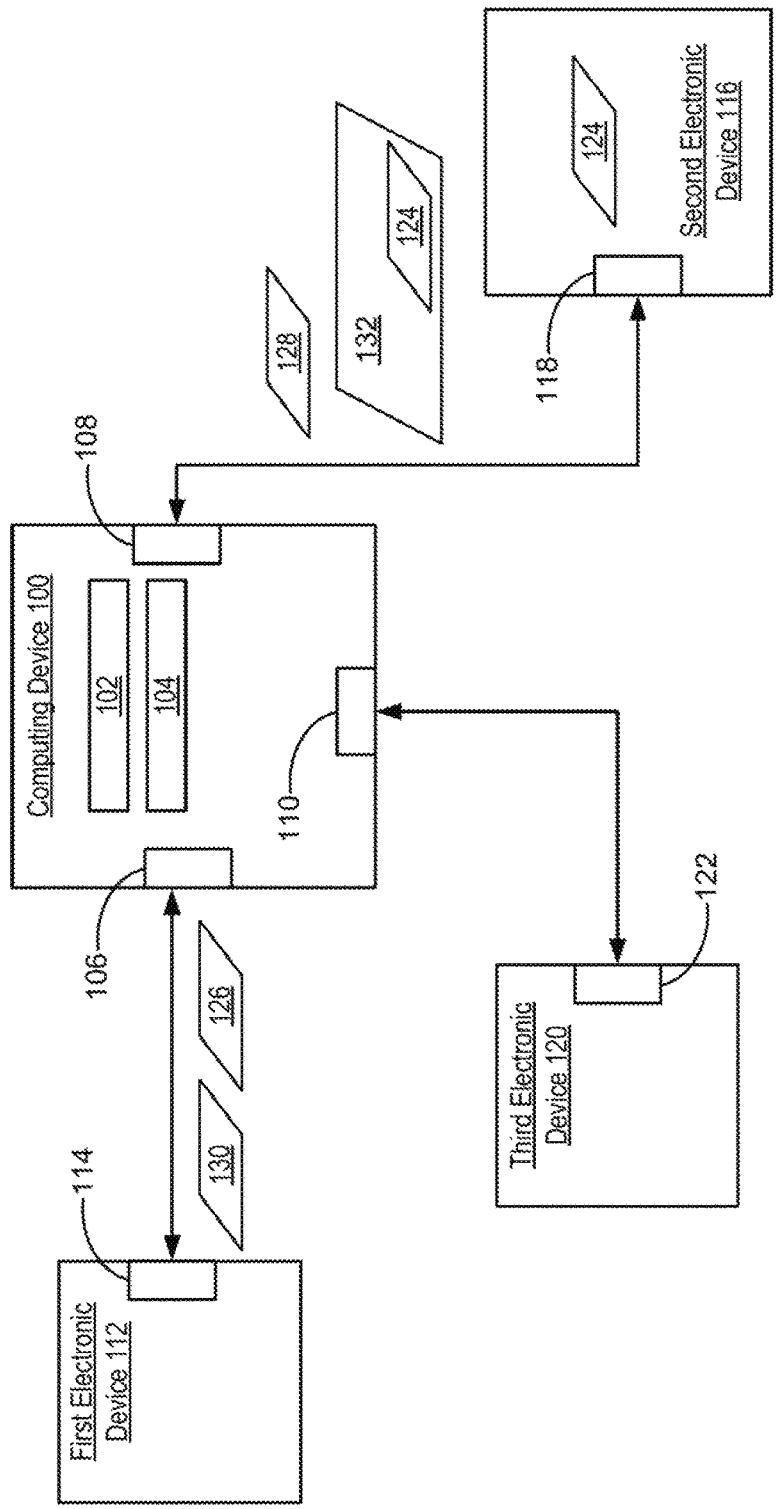
FIG. 1 illustrates a computing device to control a first electronic device using calibration data stored in second electronic device as descriptor information, according to an example.

FIG. 1 illustrates a computing device 100 to control a first electronic device using calibration data stored in second electronic device as descriptor information, according to an example. Computing device 100 may be, for example, a notebook computer, a desktop computer, an all-in-one system, a tablet computing device, a mobile phone, an electronic book reader, or any other electronic device suitable to retrieve calibration data using a universal serial bus (USB) protocol. Computing device 100 may include a processor 102 and a computer-readable storage medium 104 to control operations of computing device 100 and/or electronic devices connected to computing device 100. Computing device 100 may also include a first communication interface 106, a universal serial bus (USB) interface 108, and a second communication interface 110, USB interface 108 may be implement at least one type of the USB protocol. For example, the USB protocol may be USB 1.x, USB 2.0, USB 3.0, USB 3.1, USB Type-C, etc.

Communication interfaces 106 and 110 may be a device or circuit to enable computing device to communicate with another electronic device. In some examples, communication interface 106 may be a wireless interface implementing the Bluetooth protocol. In some examples, communication interface 106 may be a hardware connector implementing at least one type of the USB protocol, such as USB 2.0, USB 3.0, USB 3.1, USB Type-C, etc. Communication interface 110 may be a display interface implementing a DisplayPort interface, a high-definition multimedia interface (HDMI), or any other interface suitable for communication with a display device.

During operation, computing device 100 and first electronic device 112 may be connected via first communication interface 106 and a communication interface 114 of first electronic device 112. Communication interface 114 may be compatible with first communication interface 106. For example, communication interfaces 106 and 114 may implement the same communication protocol. Computing device 100 and a second electronic device 116 may be connected via USB interface 108 and a USB interface 118 of second electronic device 116. USB interface 118 may be compatible with USB interface 108. Computing device 100 and a third electronic device 120 may be connected via second communication interface 110 and a communication interface 122 of third electronic device 120. Communication interface 122 may be compatible with second communication interface 110.

In response to establish a connection with first electronic device 112, computing device 100 may determine, for example via a device driver of first electronic device 112, that first electronic device 112 may operate with third electronic device 120 together and first electronic device 112 may use calibration data 124 during operation. Calibration data 124 may be calibration data of third electronic device 120 and may be generated during a calibration operation of third electronic device 120 during manufacturing. Calibration data 124 may be any information usable to provide correction to a performance deviation or characteristic deviation of third electronic device 120. Second electronic device 116 may store calibration data 124 in descriptor information of the USB protocol. As used herein, descriptor information may be a data structure, as specified in the USB protocol, used by a USB end point device (e.g., second electronic device 116) to provide information about the USB end point device. In some examples, descriptor information may be formatted as a device descriptor, a configuration descriptor, a string descriptor, or an interface association descriptor as specified by the USB protocol.

To retrieve calibration data 24, computing device 100 may transmit a distinct get descriptor request to every electronic device that is connected via the USB protocol. For example, when data communication interface 106 is a USB interface, computing device 100 may transmit a get descriptor request 126 to first electronic device 112. In response to receiving get descriptor request 126, first electronic device 112 may transmit descriptor information 130 of first electronic device 112 to computing device 100.

Computing device 100 may also transmit a get descriptor request 128 to second electronic device 116. In response to receiving get descriptor request 128, second electronic device 116 may transmit descriptor information 132 of second electronic device 116 to computing device 100. Descriptor information 132 may include calibration data 124. As an example, descriptor information 130 and 132 may be formatted as string descriptors of the USB protocol. Thus, calibration data 124 may be formatted to be part of a string descriptor.

Computing device 100 may examine descriptor information 130 and 132 to identify calibration data 124. In some examples, descriptor information 132 may include an identifier string to indicate the presence of calibration data 124. The identifier string may be included in descriptor information 132. When computing device 100 locates the identifier string during examination of descriptor information 132, computing device 100 may determine that calibration data 124 is included in descriptor information 132. Thus, computing device 100 may use calibration data 124 to control first electronic device 112.

Figure 2:
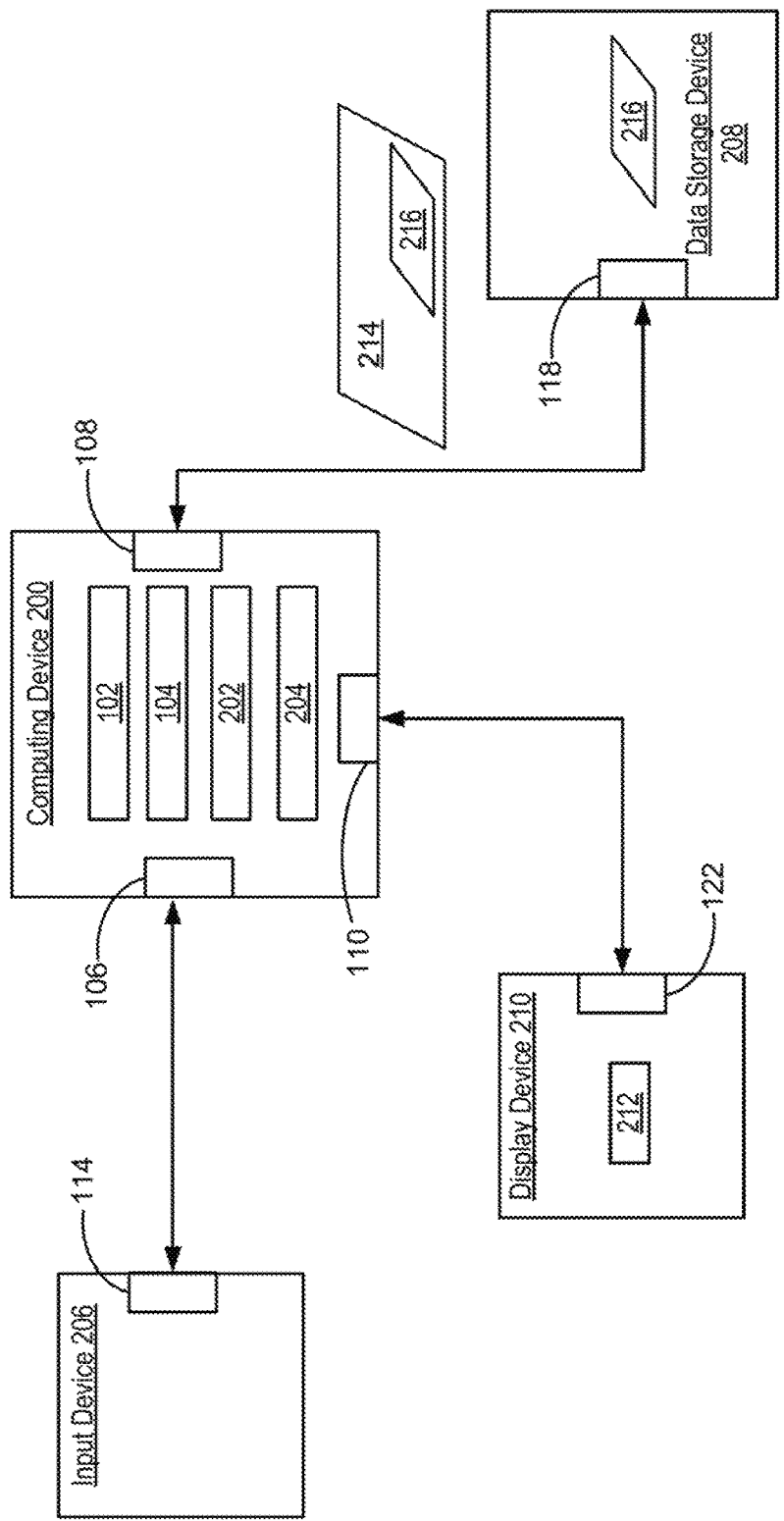
FIG. 2 illustrates a computing device to control a first electronic device using calibration data stored in second electronic device as descriptor information, according to another example.

FIG. 2 illustrates a computing device 200 to control a first electronic device using calibration data stored in second electronic device as descriptor information, according to another example. Computing device 200 may be similar to computing device 100 of FIG. 1. Computing device 200 may include processor 102, computer-readable storage medium 104, a device driver 202, an operating system 204, first communication interface 106, second communication interface 110, and USB interface 108. Device driver 202 and operating system 204 may be implemented as processor executable instructions, such as instructions encoded in computer-readable storage medium 104 that are executable by processor 102. Device driver 202 may be an application to control operations of an input device 206. Operating system 204 may be an application to control operations of computing device 200.

First electronic device 112 of FIG. 1 may be implemented as input device 206. For example, input device 206 may be a digital pen that provides input to computing device 100. Input device 206 and computing device 200 may be connected via communication interface 114 and 106, respectively. Second electronic device 116 may be implemented as a data storage device 208, such as a non-volatile data storage device. Data storage device 208 and computing device 100 may be connected via USB interface 118 and 108, respectively. Third electronic device 120 may be implemented as a display device 210, such as a touch-enabled display device. Display device 210 and computing device 100 may be connected via communication interface 122 and 110, respectively.

Display device 210 may include an optical pattern 212 that provides positional information to input device 206 during operation. For example, a user may provide input to computing device 200 by using input device 206 to draw on display device 210. Input device 206 may determine movements of input device 206 via optical pattern 212. Input device 206 or computing device 200 may translate the movements to inputs to computing device 200. Optical pattern 212 may be disposed on display device 210 during manufacturing.

During operation, in response to establishing a connection with input device 206, device driver 202 may request operating system 204 to provide descriptor information associated with electronic device(s) connected to computing device 100 via the USB protocol. Operating system 204 may receive descriptor information 214 from data storage device 208 in a manner described in FIG. 1. Descriptor information 214 may include calibration data 216 of display device 210. An example of calibration data 216 is described in more detail in FIG. 6. Device driver 202 may receive descriptor information 214 from operating system 204. Device driver 202 may identify calibration data 216 during examination of descriptor information 214 in a manner described in FIG. 1. Device driver 202 may use calibration data 216 to control input device 206 during operation.

Figure 3:
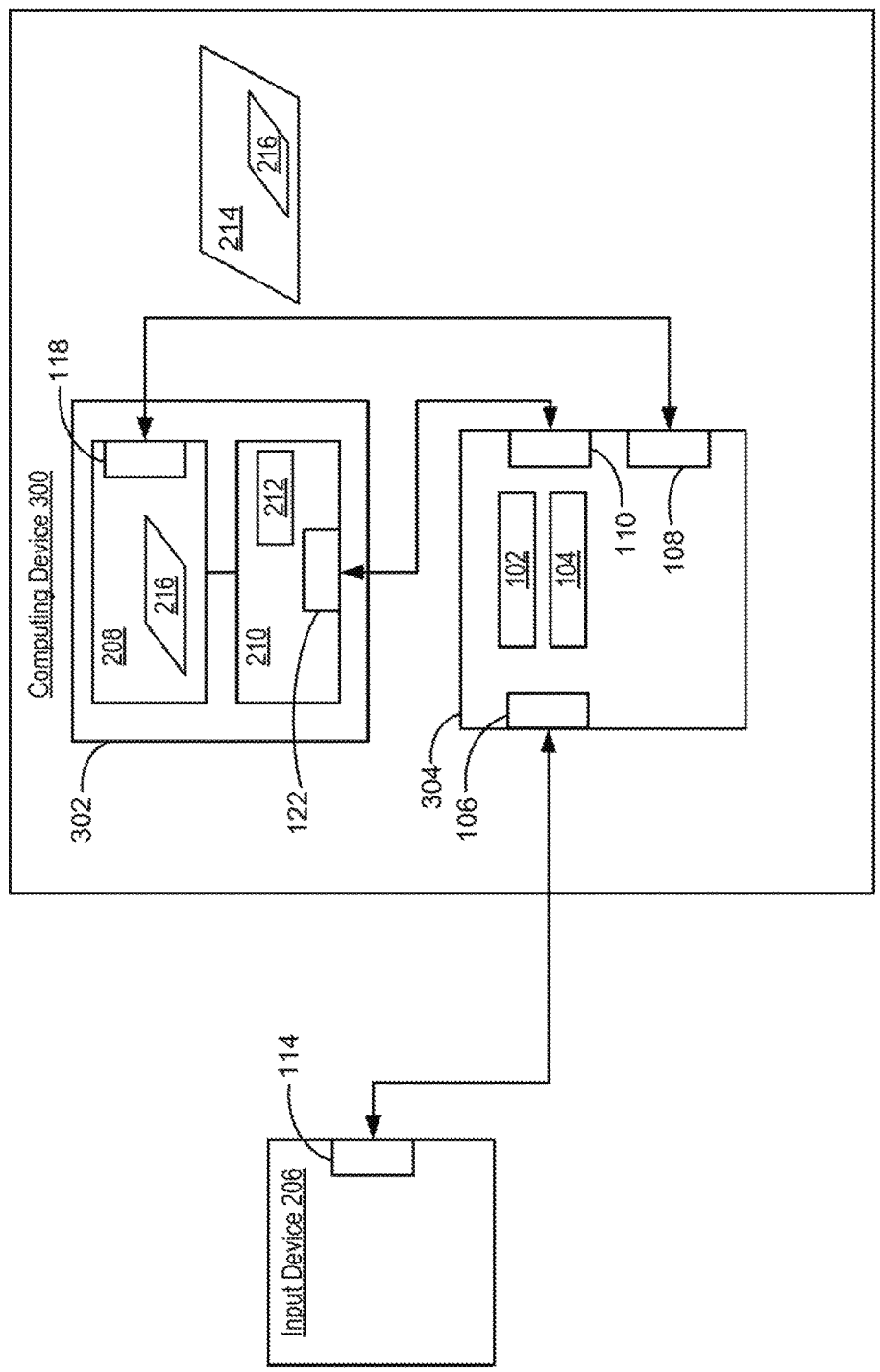
FIG. 3 illustrates a computing device to control a first electronic device using calibration data stored in second electronic device as descriptor information, according to another example.

FIG. 3 illustrates a computing device 300 to control a first electronic device using calibration data stored in second electronic device as descriptor information, according to another example. Computing device 300 may include a display module 302 and a computing module 304. Display module 302 and computing module 304 may be components of computing device 300 and may be located within a housing of computing device 300. Display module 302 may include data storage device 208 of FIG. 2 and display device 210. Data storage device 208 may be affixed to display device 210. For example, data storage device 208 may be affixed to display device 210 using adhesive or a mechanical fastener. Thus, data storage device 208 and display device 210 are not in data communication. Calibration data 216 that is generated during a calibration operation of display device 210 may stay with display device 210 during servicing of computing device 300 (e.g., removing display module 302 from computing device 300 temporarily to replace a component in computing device 300).

Computing module 304 may include processor 102, computer-readable storage medium 104, first communication interface 106, USB interface 108, and second communication interface 110. Computing module 304 and data storage device 208 may be connected via USB interface 108 and 118, respectively. Computing module 304 and display device 210 may be connected via communication interface 110 and 122, respectively.

During operation, a connection may be established between computing module 304 and input device 206 via communication interface 106 and 114, respectively. In response to establishing the connection, computing module 304, via processor 102, may request descriptor information from electronic device(s) connected via the USB protocol. For example, computing module 304 may request descriptor information 214 from data storage device 208. Computing module 304 may identify calibration data 216 by examining descriptor information 214. Computing module 304 may control input device 206 using calibration data 216.

Figure 4:
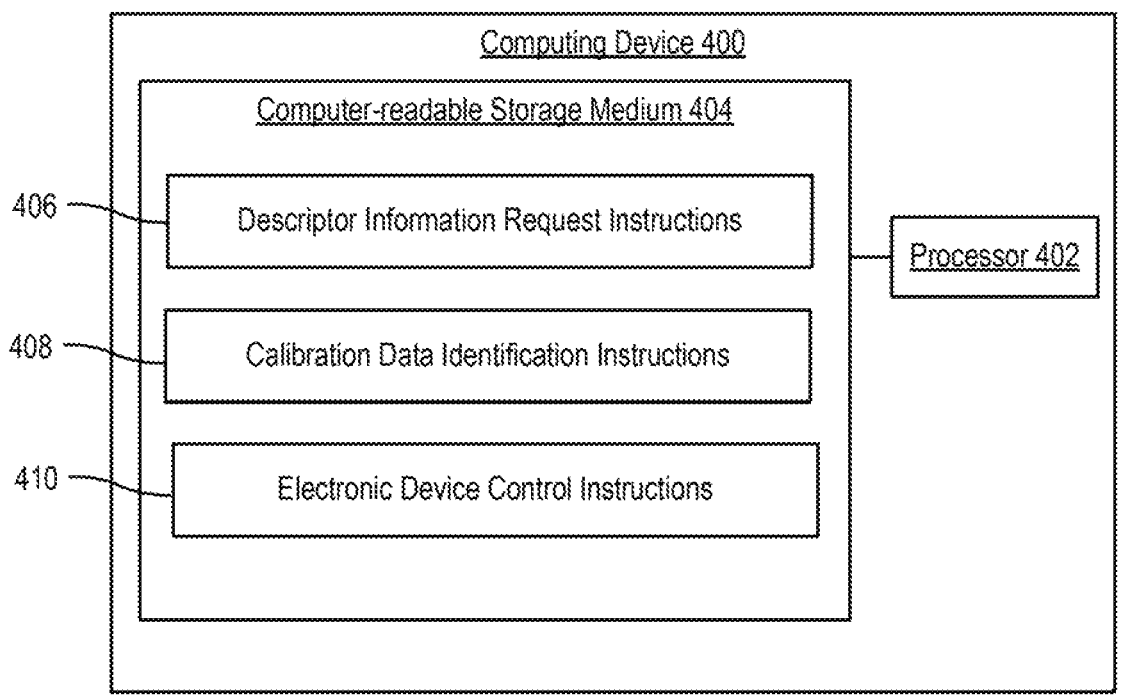
FIG. 4 illustrates a computing device to control a first electronic device using calibration data stored in second electronic device as descriptor information, according to another example.

FIG. 4 illustrates a computing device 400 to control a first electronic device using calibration data stored in second electronic device as descriptor information, according to another example. Computing device 400 may include a processor 402 and a computer-readable storage medium 404. Computing device 400 may implement computing device 100 of FIG. 1, computing device 200 of FIG. 2, and/or computing device 300 of FIG. 3.

Processor 402 may be a central processing unit (CPU), a semiconductor-based microprocessor, and/or other hardware devices suitable for retrieval and execution of instructions stored in computer-readable storage medium 404. Processor 402 may fetch, decode, and execute instructions 406, 408, 410, or a combination thereof. As an alternative or in addition to retrieving and executing instructions, processor 402 may include at least one electronic circuit that includes electronic components for performing the functionality of instructions 406, 408, 410, or a combination thereof.

Computer-readable storage medium 404 may be any electronic, magnetic, optical, or other physical storage device that contains or stores executable instructions. Thus, computer-readable storage medium 404 may be, for example, Random Access Memory (RAM), an Electrically Erasable Programmable Read-Only Memory (EEPROM), a storage device, an optical disc, etc. In some examples, computer-readable storage medium 404 may be a non-transitory storage medium, where the term "non-transitory" does not encompass transitory propagating signals. Computer-readable storage medium 404 may be encoded with a series of processor executable instructions 406, 408, and 410.

Descriptor information request instructions 406 may request descriptor information from electronic device(s) connected to computing device 400 via the USB protocol. For example, referring to FIG. 1, computing device 100 may also transmit a get descriptor request 128 to second electronic device 116.

Calibration data identification instructions 408 may identify calibration data based on descriptor information. For example, referring to FIG. 1, computing device 100 may examine descriptor information 130 and 132 to identify calibration data 124.

Electronic device control instructions 410 may control an electronic device using the calibration data. For example, referring to FIG. 1, computing device 100 may use calibration data 124 to control first electronic device 112.

Figure 5:
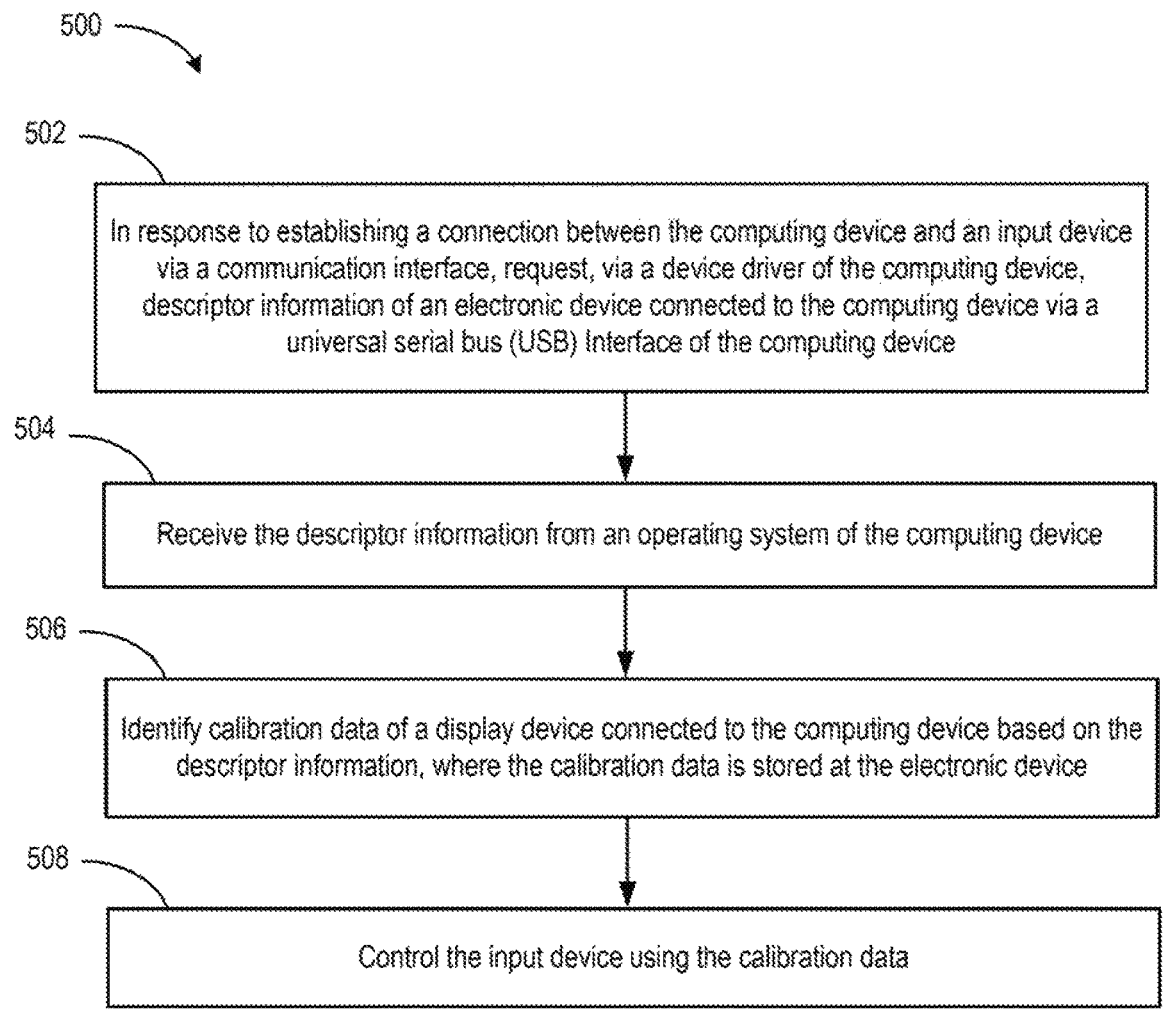
FIG. 5 illustrates a method of operation at a computing device to control a first electronic device using calibration data stored in second electronic device as descriptor information, according to another example.

FIG. 5 illustrates a method 500 of operation at a computing device to control a first electronic device using calibration data stored in second electronic device as descriptor information, according to another example. Method 500 may be implemented using computing device 100, 200, 300, and/or 400.

Method 500 includes, in response to establishing a connection between the computing device and an input device via a communication interface, requesting, via a device driver of the computing device, descriptor information of an electronic device connected to the computing device via a universal serial bus (USB) interface, at 502. For example, referring to FIG. 1, in response to establishing a connection with first electronic device 112, computing device 100 may transmit get descriptor request 128 to second electronic device 116. Method 500 also includes receiving the descriptor information from an operating system of the computing device, at 504. For example, referring to FIG. 2, device driver 202 may receive descriptor information 214 from operating system 204.

Method 500 further includes identifying calibration data of a display device connected to the computing device based on the descriptor information, where the calibration data is stored at the electronic device, at 506. For example, referring to FIG. 2, device driver 202 may identify calibration data 216 during examination of descriptor information 214. Method 500 further includes controlling the input device using the calibration data. For example, referring to FIG. 2, device driver 202 may use calibration data 216 to control input device 206 during operation.

Figure 6:
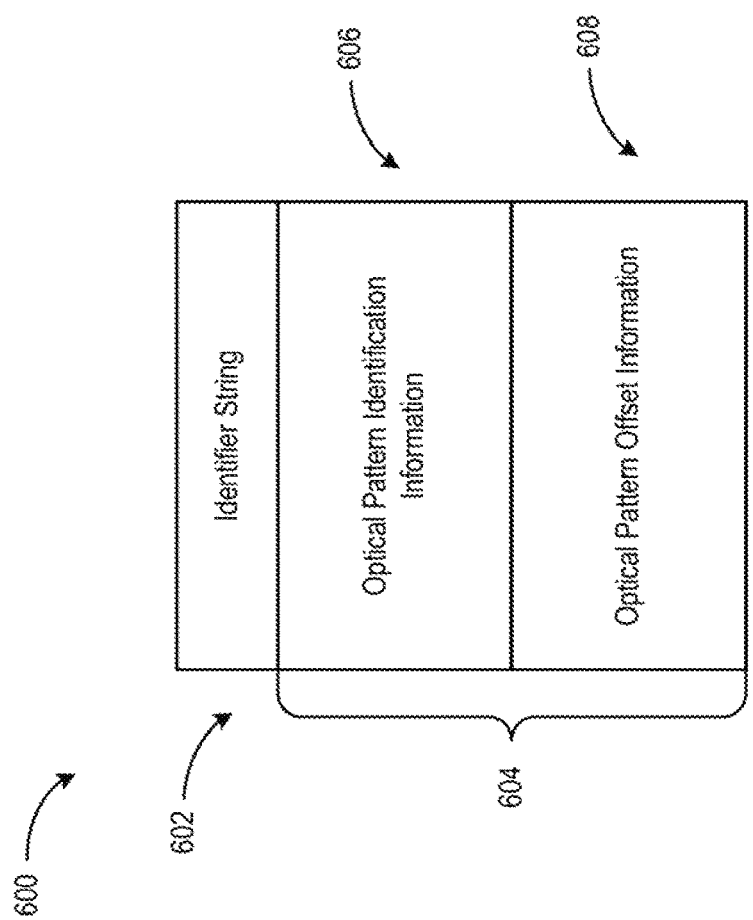
FIG. 6 illustrates the format of descriptor information that includes calibration data, according to an example.

FIG. 6 illustrates the format of descriptor information 600 that includes calibration data, according to an example. Descriptor information 600 may implement descriptor information 132 of FIG. 1 and/or descriptor information 214 of FIGS. 2-3. Descriptor information 600 may include an identifier string 602 and calibration data 604. Identifier string 602 may indicate the presence of calibration data 604. For example, identifier string 602 may be implemented as a particular string of text characters to indicate the presence of calibration data 604. Calibration data 604 may include optical pattern identification information 606 and optical pattern offset information 608. Optical pattern identification information 606 may indicate a type of the optical pattern disposed on a display device, such as the type of optical pattern 212. Optical pattern offset information 608 may indicate offset information specific to the optical pattern disposed on the display device.

The use of "comprising", "including" or "having" are synonymous and variations thereof herein are meant to be inclusive or open-ended and do not exclude additional unrecited elements or method steps.

What is claimed is:

1. A non-transitory computer-readable storage medium comprising instructions that when executed cause a processor of a computing device to:
    in response to establishing a connection between the computing device and a first electronic device, determine, using a device driver for the first electronic device, the first electronic device is operable with a third electronic device;
    based on the determination the first electronic device is operable with the third electronic device, request descriptor information of a second electronic device connected to the computing device via a universal serial bus (USB) interface of the computing device;
    identify calibration data of the third electronic device connected to the computing device based on the descriptor information, wherein the calibration data is stored at the second electronic device; and
    control the first electronic device using the calibration data.

2. The non-transitory computer-readable storage medium of claim 1, wherein the descriptor information includes an identifier string and the calibration data, wherein the identifier string indicates a presence of the calibration data in the descriptor information.

3. The non-transitory computer-readable storage medium of claim 2, wherein the instructions when executed further cause the processor to identify the calibration data using the identifier string.

4. The non-transitory computer-readable storage medium of claim 1, wherein the descriptor information is formatted as a string descriptor of a USB protocol.

5. The non-transitory computer-readable storage medium of claim 1, wherein the first electronic device is an input device, wherein the second electronic device is a data storage device, wherein the third electronic device is a display device, and wherein the calibration data includes identification information of an optical pattern disposed on the display device.

6. The non-transitory computer-readable storage medium of claim 5, wherein the calibration data further includes offset information of the optical pattern disposed on the display device.

7. A method comprising:
in response to establishing a connection between a computing device and an input device via a communication interface, determining, using a device driver for the input device, the input device is operable with a display device;
based on the determination the input device is operable with the display device, requesting, via the device driver of the computing device, descriptor information of an electronic device connected to the computing device via a universal serial bus (USB) interface;
receiving the descriptor information from an operating system of the computing device;
identifying calibration data of the display device connected to the computing device based on the descriptor information, wherein the calibration data is stored at the electronic device; and
controlling the input device using the calibration data.

8. The method of claim 7, wherein the descriptor information includes an identifier string and the calibration data, and wherein the identifier string indicates a presence of the calibration data in the descriptor information.

9. The method of claim 8, wherein identifying the calibration data includes identifying the calibration data using the identifier string.

10. The method of claim 7, wherein the descriptor information is formatted as a string descriptor of a USB protocol.

11. A computing device comprising:
a display module including:
a display device; and
an electronic device affixed to the display device mechanically, wherein the electronic device is to store calibration data associated with the display device; and
a computing module including:
a communication interface;
a universal serial bus (USB) interface;
a display interface to connected to the display device; and
a processor to:
in response to establishing a connection with an input device via the communication interface, determine, using a device driver for the input device, that the input device is operable with the display device;
based on the determination that the input device is operable with the display device, identify the calibration data based on descriptor information of the electronic device; and
control the input device using the calibration data.

12. The computing device of claim 11, wherein the display device includes an optical pattern to provide positional information to the input device.

13. The computing device of claim 12, wherein the calibration data includes identification information of the optical pattern and offset information of the optical pattern.

14. The computing device of claim 12, wherein the communication interface is a second USB interface or a wireless interface.

15. The computing device of claim 11, wherein the processor is further to identify the calibration data using an identifier string of the descriptor information.

* * * * *